United States Patent [19]

Palmer

[11] Patent Number: 4,959,638

[45] Date of Patent: Sep. 25, 1990

[54] COMBUSTION EFFICIENCY ANALYZER, ACOUSTIC

[75] Inventor: Herbert A. Palmer, Annapolis, Md.

[73] Assignee: The United States of America as represented by the Secretary of the Navy, Washington, D.C.

[21] Appl. No.: 374,710

[22] Filed: Jul. 3, 1989

Related U.S. Application Data

[63] Continuation of Ser. No. 130,503, Dec. 9, 1987, abandoned.

[51] Int. Cl.⁵ .................................... G08B 21/00
[52] U.S. Cl. ...................................... 340/577; 73/112; 73/116; 73/587; 431/13
[58] Field of Search ............... 340/577; 73/116, 112, 73/602, 587; 431/75, 77, 78, 13

[56] References Cited

U.S. PATENT DOCUMENTS 2,966,209 12/1960 Pegrum ............................ 431/78
3,635,018 1/1972 DeCorso et al. .................. 340/577

Primary Examiner—Glen R. Swann, III
Attorney, Agent, or Firm—Luther A. Marsh

[57] ABSTRACT

A device for monitoring combustion efficiency of a burner with a burner flame has an acoustic sensor probe positioned within the burner, flame signature generating circuitry responsive to the acoustic probe, means for correlating flame signatures with known optimum efficiency characteristics to yield an indication of relative combustion efficiency, and output means for display of the relative combustion efficiency.

2 Claims, 1 Drawing Sheet

COMBUSTION EFFICIENCY ANALYZER, ACOUSTIC

CROSS REFERENCE TO A RELATED APPLICATION

This is a continuation of application Ser. No. 07/130,503, filed 12/09/87, now abandoned.

BACKGROUND OF THE INVENTION

Field of the Invention

This invention relates to an Acoustic Combustion Efficiency Analyzer. More particularly, it relates to a means of directly monitoring the acoustic emission characteristics of the chemical process of combustion. Still more particularly, it relates to a means of monitoring the combustion efficiency of a burner utilizing the sonic and ultrasonic frequency ranges.

DESCRIPTION OF THE PRIOR ART

Combustion equipment is sensitive to changes in atmospheric conditions. Insufficient air results in incomplete combustion of fuel; excess air quenches flame temperature and reduces the efficiency of heat transfer. Also, combustion equipment, particularly of the oil-fueled variety, is readily thrown out of adjustment by such phenomena as progressive fouling. Constant and precise burner flame adjustments are required in order to maximize burner efficiency in the presence of atmospheric changes and progressive fouling.

Heretofore, combustion efficiency has been determined by analyzing the gas products of combustion. An evaluation of efficiency is made based upon the percentage of carbon dioxide, oxygen, and carbon monoxide gases present in the flue.

A major shortcoming of this method of evaluating combustion efficiency is it's inaccuracy, which results from the practical difficulty in precisely measuring the amounts of the various gases escaping from the burner. More direct methods of measuring combustion efficiency by evaluating, for example, flame brightness, radiation emissions, or heat release—have not yet become practical realities.

There are several flame monitoring systems which have been heretofore devised. For example, a flame responsive system disclosed in U.S. Pat. No. 3,995,221 comprises a flame sensor that produces an electrical output signal derived from the monitored flame environment, enhancing circuitry that augments the monitored flame component of the electrical signal and concurrently suppresses the background component of the electrical signal, and discriminating output means that rapidly indicates large changes in flame signal and slowly indicates smaller changes in flame signal. A further example of a flame monitoring system is disclosed in U.S. Pat. No. 4,157,506, which determines the absence of a flame by impressing a potential difference across the region to be monitored and producing a flame signal that is indicative of the amount of current flowing through the region in response to the potential difference. Other optical systems differentiate flame-on and flame-off. None, however, acoustically monitor combustion efficiency.

SUMMARY OF THE INVENTION

The present invention provides a method and device for monitoring the combustion efficiency of a burner unit. The sonic and ultrasonic emissions of a burner and burner flame are detected, assembled into a unique acoustic signature, and then compared in signature form to know optimum efficiency spectrum characteristics. Yielded is a relative indication of efficiency.

Accordingly, it is therefore an object of this invention to provide a device for directly monitoring the combustion efficiency of a burner unit which comprises an acoustic sensor probe, flame signature generating circuitry responsive to the acoustic sensor probe, means for correlating flame signatures with known optimum efficiency characteristics to yield an indication of relative combustion efficiency, and output means for display of the relative combustion efficiency.

Another object of the present invention is to provide a novel method of directly monitoring the combustion efficiency of a burner unit with a burner flame comprising the steps of detecting acoustic emissions of the burner and burner flame utilizing an acoustic sensor probe, constructing a signature of combustion from the spectrum of detected emissions, by a comparative process the signature of combustion with a standard signature to produce indication of relative combustion efficiency, and displaying the resultant indication of relative combustion efficiency.

A third object of this invention is to provide a method and device for measuring the combustion efficiency of a burner unit that is more accurate than present methods and devices.

A fourth object of this invention is to provide a method of measuring the combustion efficiency of a burner unit which will respond to all abnormal conditions.

Further objects are to provide a method and device for measuring the combustion efficiency of a burner which are reliable, precise, efficient, direct, passive, and insensitive to sensor contamination.

Other objects and many of the attendant advantages of this invention will be readily appreciated as the same becomes better understood by reference to the following detailed description.

DETAILED DESCRIPTION OF INVENTION

Figure 1:
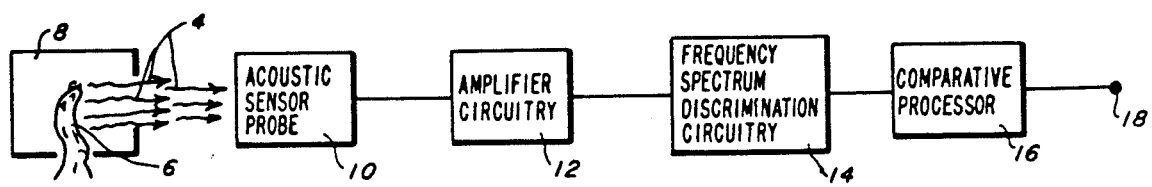
FIG. 1 is a block diagram of an acoustic combustion efficiency analyzer, in accordance with the invention.

Referring now to the drawings, the acoustic combustion efficiency analyzer, shown in FIG. 1 includes a flame sensor 10 that provides an electric signal from the monitored flame environment, which signal is processed by amplifier circuitry 12 and frequency spectrum discrimination circuitry 14 and correlated by a comparative processor 16 to provide an output signal at terminal 18. Also shown in FIG. 1 are a portion of a burner 8, a flame 6 within that burner 8, and acoustic emissions 4 from both the burner 8 and flame 6.

Optimum location for the acoustic sensor 10 within the burner 8 would vary depending upon individual burner design and characteristics; therefore, empirical determination of optimum location for the acoustic sensor within any particular burner is prescribed.

Amplifier circuitry 12 is a conventional type. Likewise, frequency spectrum discrimination circuitry 14 is conventional and widely known in industry. For example, the Dunegan-Endevco acoustic emission system can be used to analyze signals with frequencies up to 2

Figure 2:
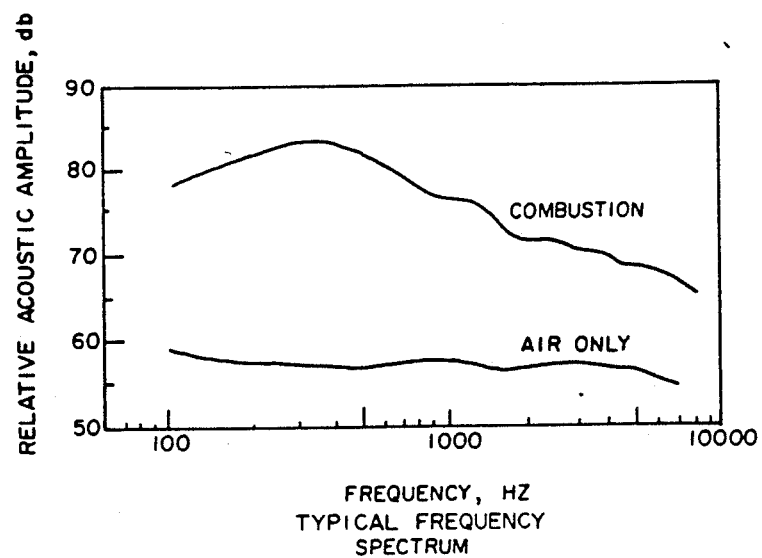
FIG. 2 is a graph indicating frequency spectra with and without combustion.
Figure 3:
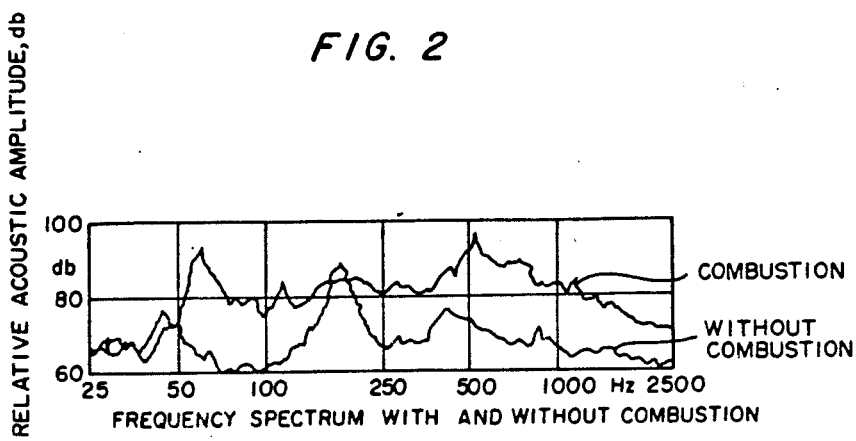
FIG. 3 is a graph indicating typical combustion noise spectra.

MHZ. A primary function of this circuitry is to determine the amount of energy present at each frequency. In addition, this circuitry can serve to filter out frequencies for which correlation in the comparative processor 16 is not desired. Referring to FIG. 2 and FIG. 3, shown are portions of a typical combustion frequency spectrum with and without combustion. Analysis of sonic and ultrasonic spectra would not be required, but each contributes, and the more information the better the results. The sonic spectrum gives information about the flame and also reflects burner, motor, bearings, fan, fan blades, and oil pump operation. The ultrasonic spectrum provides information on fuel flow, atomizing nozzle (if used), and steam flow (if used) in that ultrasonic emissions are related to such variables as atomized particle size, rate of heat transfer (heat release rate), combustion rate (or flame front speed), amount and quality of excess air; and shape of combustion chamber.

Correlation of individual signatures is performed by a comparative processor 16, a microprocessor of conventional type. Optimum efficiency is calculated or measured and entered into the comparative processor as a standard to which individual readings are compared. Frequency peaks, general wide band amplitudes, and variations in amplitude at given fixed frequencies are compared or correlated to yield a relative indication of combustion efficiency.

The acoustic emissions 4 from both burner 8 and flame 6 are analyzed and adjusted, as necessary, to obtain optimum efficiency by use of an off the shelf FLU GAS ANALYZER, acoustic sensor probe 10, by United Technologies, 301 Alpha Drive, Pittsburgh, Pa. 15238. An optimum burner 8 and flame 6 combustion efficiency signature is standardized by measuring and calculated for each type of burner 8 unit utilized using Utility Kit, Catalog No. 10-5022 or 10-5014 and FY-RITE $CO_2$ Indicator, Manufacturer No. 10-5000 of the aforementioned and identified FLU GAS ANALYZER. This standard signature is then used to compare in Comparative Processor 16 in burner 8's subsequent use to adjust as necessary if the two frequency spectrums differ to obtain optimum efficiency. The FLU GAS ANALYZER, acoustic sensor probe 10 stores a base line frequency in comparative processor 16 and subsequently compares the current frequency spectrum with periodically obtained frequency spectrums and adjusts as necessary if the two spectrum differ to obtain an optimum efficiency. The hardware of comparative processor 16 is a ROCKLAND'S SYSTEM 90 by Rockland Scientific, 10 Volvo Drive, Rockleigh, N.J. 07647, a computer designed for the specific end use. The correlation is the comparing base line optimum combustion efficiency signature derived from the standard signature with the periodic subsequent check/s of the current burner 8 signature and adjusting or correlating to keep an optimum combustion efficiency.

A burner operator can, on the basis of terminal 18 output, adjust burner flame to maximize combustion efficiency.

What is claimed is:

1. An acoustic combustion efficiency analyzer for monitoring the combustion efficiency of a burner unit with a burner flame for optimum efficiency which comprises:

an acoustic sensor probe for providing an electrical signal from the burner flame, an amplifier circuit interfaced with the acoustic sensor probe for processing the signal received from the acoustic sensor probe, a frequency spectrum discrimination circuit interfaced with the amplifier circuit and a comparative processor for processing the signal received from the amplifier circuit, a comparative processor interfaced with the frequency spectrum discriminating circuit and an output circuit for analysis of the signal by comparison with a known optimum efficiency signal, and an output circuit interfaced with the comparative processor for monitoring and displaying the combustion efficiency of the burner unit.

2. The acoustic combustion efficiency analyzer as in claim 1 wherein the acoustic sensor probe comprises a transducer mounted to receive, within a preselected frequency range, the characteristic acoustic signals from the burner flame and convert the acoustic signals to electrical signals.

* * * * *